(12) United States Patent
Cobb et al.

(10) Patent No.: US 6,183,258 B1
(45) Date of Patent: Feb. 6, 2001

(54) METHOD OF ENCOURAGING REGISTRATION OF ANIMALS WITH A BREED REGISTRY

(75) Inventors: Charles Craig Cobb, Caulfield; Rocky D. McMahan, Neosho, both of MO (US)

(73) Assignee: United All Breed Registry, Inc., Caulfield, MO (US)

( * ) Notice: Under 35 U.S.C. 154(b), the term of this patent shall be extended for 0 days.

(21) Appl. No.: 09/340,842

(22) Filed: Jun. 28, 1999

(51) Int. Cl.[7] .................................................. G09B 19/00
(52) U.S. Cl. ............................................. 434/154; 434/107
(58) Field of Search ..................................... 434/107, 108, 434/109, 154, 322; 205/500; 283/48.1, 55, 66.1, 66.2, 115; 119/174

(56) References Cited

U.S. PATENT DOCUMENTS

| | | | | |
|---|---|---|---|---|
| 1,098,833 | * | 6/1914 | Olinger | 434/154 |
| 4,201,386 | * | 5/1980 | Seale et al. | 434/154 |
| 4,332,565 | * | 6/1982 | Mialet | 434/154 |
| 4,483,680 | * | 11/1984 | Daly | 434/154 |

OTHER PUBLICATIONS

Litter Registration Application for the American Kennel Club, exact publication date unknown, but at least one year prior to the filing of the present application.

AKC Dog Registration Application, front and back, exact publication date unknown, but at least one year prior to the filing of the present application.

Supplemental Transfer Statement issued by the American Kennel Club, exact publication date unknown, but at least one year prior to the filing of the present application.

AKC Registration Certificate; exact publication date of similar certificate unknown, but at least one year prior to the filing of the present application.

Rules Applying to Registration and Discipline of the American Kennel Club, published on the American Kennel Club website (www.akc.org) exact publication date unknown, but at least one year prior to the filing of the present application.

Copies of two pages from the American Kennel Club website (www.akc.org) including sections on Papers and Identification, AKC Registered and Quality, and How AKC Registration Functions, exact publication date unknown, but at least one year prior to the filing of the present application.

(List continued on next page.)

*Primary Examiner*—Sam Rimell
(74) *Attorney, Agent, or Firm*—Shughart Thomson & Kilroy P.C.

(57) ABSTRACT

A method for encouraging purchasers of pets or other types of animals to register the animals with a genealogical or breed registry involves providing a purchaser of an animal, at the time of purchase, an application form for registration of the animal with the registry wherein the application form has printed thereon sire and dam information for at least two and preferably three or four immediately previous generations of the animal to permit the purchaser to make informed purchasing decisions concerning the genetic history of the animal at the time of purchase. The purchaser of an individual animal is instructed by instructions on the registration application to complete the application by providing a name for the animal and to return the application to the registry. Upon receipt of the application, the registry assigns a registration number to the animal and issues a certificate of registration to the purchaser including the name and registration number of the animal, and the sire and dam information for at least two immediately previous generations of the animal.

15 Claims, 9 Drawing Sheets

OTHER PUBLICATIONS

America's Pet Registry Purebred Litter Registration Application, exact publication date unknown, but at least one year prior to the filing of the present application.

Professional Breeder Application for Free Dual Registration of a Dog (front and back) issued by America's Pet Registry, exact publication date unknown, but believed to be at least one year prior to the filing of the present application.

Certificate of Registration for America's Pet Registry, front and back, exact publication date unknown, but at least one year prior to the filing of the present application.

Cat Registration Application issued by the Cat Fanciers' Association, Inc., exact publication date unknown, but at least one year prior to the filing of the present application.

Application for Registration for a Single Dog in the Universal Kennel Club, exact publication date unknown, but at least one year prior to the filing of the present application.

How to Register Your Dairy Goat, published by the American Dairy Goat Association on its website www.adga.org, exact publication date unknown, but assumed to be at least one year prior to the filing of the present application.

Application for Registration or Recordation with the American Dairy Goat Association, exact publication date unknown, but assumed to be at least one year prior to the filing of the present application.

Certificate of Registry with the American Dairy Goat Association, exact publication date unknown, but it is assumed that similar certificates were published at least one year prior to the filing of the present application.

AKC Procedures for Registration matters, obtained from the American Kennel club.*

* cited by examiner

Fig. 1.

AMERICAN REGISTRY OF RARE BREEDS
DOG REGISTRATION APPLICATION PROVIDED BY BREEDER OF RECORD

Breeder: Kristine G. Roberts
Breed: Cavalier King Charles Sp.
DOB: 10-10-97
Litter# DCAL99-2765

Sire:
AM CH LANOLA TUDELA DE LA FUENTE AMANTRA
TN223787/01
blenheim

- TORAYLAC JOSHUA
  - HOMERBRENT JEREMY AT COTTISMEER
  - TORAYLAC MYSTICAL MUSIC MAKER
- Irish CH AMANTRA FOOL TO LOVE OF LANOLA
  - HANDALE SAM YULE AT AMANTRA
  - AMANTRA GOOD COMPANY Dam:
WEDGWOOD SOMMERSETT
TN359439/01
blenheim

- CRAIGOWL RAINMAKER OF WEDGWOOD
  - ENG CH MILKEYN MATCHMAKER
  - ENG CH CRAIGOWL STORM OF HOMERBRENT
- HETHERSETT CICILY
  - POP CASTLE THYME
  - HALSNOCK LADY DI

DOG'S NAME [ ][ ][ ][ ][ ][ ][ ][ ][ ][ ][ ][ ][ ][ ][ ][ ][ ][ ][ ][ ][ ][ ][ ][ ][ ]

Limit to 25 Letters. Skip a box between words.
Names are subject to A.R.R.B. approval. A.R.R.B. may assign a suffix number.

Check One: ☐ Full Registration ☐ Limited Registration (Not to be used for Breeding)

If Applicable record Microchip Number:
[ ][ ][ ][ ][ ][ ][ ][ ][ ][ ][ ][ ][ ][ ][ ][ ]

Sex: _____  Color: _____

Date of Purchase: ___/___/___

TRANSFER TO:
Print New Owner's Name(s): _____
Address of Record: _____
City: _____ State: _____ Zip: _____
Phone: ( ___ ) _____
Signature(s): _____

To Register, Send your completed registration application and check or money order for $18.00 to:
American Registry of Rare Breeds
2020 Pennsylvania Ave., NW
Suite 505
Washington, DC 20006

- Please print clearly or type as we cannot be responsible for errors caused by misspelling or illegible handwriting
- Certificates issued with the right to correct or revoke by A.R.R.B.
- Any misrepresentation on this application is cause for cancellation and may result in loss of future registration privileges for those who violate the integrity of this application.
- We reserve the right to change all rules, fees, etc., without prior notice.

Fig. 2.

**CERTIFICATE OF REGISTRY WITH
AMERICAN REGISTRY OF RARE BREEDS**

Name: R AND D'S PR. OF BUTTERFLY KISSES
Breed: Cavalier King Charles Sp.
Color: blenheim
DOB: 10-10-97  Sex: M
Reg.#: DCA1263-99
Breeder: Kristine G. Roberts

MICROCHIP # 12345

Owner: Dawn Castillo
HCR 65 Box 18-1
Caulfield, MO 65626

```
                                        ┌─HOMERBRENT JEREMY AT COTTISMEER
                    ┌─TORAYLAC JOSHUA───┤
Sire:               │                   └─TORAYLAC MYSTICAL MUSIC MAKER
AM CH LANOLA TUDELA DE LA FUENTE AMANTRA
TN223787/01         │                   ┌─HANDALE SAM YULE AT AMANTRA
blenheim            └─Irish CH AMANTRA FOOL TO LOVE OF LANOLA
                                        └─AMANTRA GOOD COMPANY ┌─ENG CH MILKEYN MATCHMAKER
                    ┌─CRAIGOWL RAINMAKER OF WEDGWOOD
Dam:                │                   └─ENG CH CRAIGOWL STORM OF HOMERBRENT
WEDGWOOD SOMMERSETT │
TN359439/01         │                   ┌─POP CASTLE THYME
blenheim            └─HETHERSETT CICILY─┤
                                        └─HALSNOCK LADY DI
```

TRANSFER OF OWNERSHIP:
PRINT SELLERS NAME(S): _____
SELLERS SIGNATURE(S): _____
SELLERS PHONE: ( _____ ) _____
DATE OF SALE _____

TRANSFER TO:
PRINT NEW OWNERS NAME(S): _____
ADDRESS OF RECORD: _____
CITY: _____ STATE: _____ ZIP: _____
PHONE: ( _____ ) _____
SIGNATURE(S): _____
IF NOT PREVIOUSLY RECORDED AND APPLICABLE, RECORD MICROCHIP NUMBER:

☐☐☐☐☐☐☐☐☐☐☐☐☐☐☐

TO REGISTER, SEND YOUR COMPLETED CERTIFICATE AND CHECK OR MONEY ORDER FOR $18.00 TO:
AMERICAN REGISTRY OF RARE BREEDS
2020 PENNSYLVANIA AVE., NW
SUITE 505
WASHINGTON, DC 20006

- PLEASE PRINT CLEARLY OR TYPE AS WE CANNOT BE RESPONSIBLE FOR ERRORS CAUSED BY MISSPELLING OR ILLEGIBLE HANDWRITING.
- CERTIFICATES ISSUED WITH THE RIGHT TO CORRECT OR REVOKE BY A R R B.
- ANY MISREPRESENTATION ON THIS APPLICATION IS CAUSE FOR CANCELLATION AND MAY RESULT IN LOSS OF FUTURE REGISTRATION PRIVELEGES FOR THOSE WHO VIOLATE THE INTEGRITY OF THIS APPLICATION
- WE RESERVE THE RIGHT TO CHANGE ALL RULES, FEE, ETC. WITHOUT PRIOR NOTICE

Fig. 3.

UNITED ALL BREED REGISTRY AND PEDIGREE SERVICE
REGISTRATION APPLICATION PROVIDED BY OWNER OF RECORD

— 103

105
Breeder: Dawn Castillo
Breed: PUG — 106
104 { DOB: 12-27-96 — 107
Litter# DCUL98-1249 — 108

110 →

Sire:
AM CH HIGHLAND'S DOUBLE TAKE
DCU1156-99
Fawn

- AM CH DONALDSON'S SYLVESTER
  Fawn
  - AM CH LI'L DAVEY OF SHEFFIELD
    fawn
    - AM CH WOLFS LIL JOE
    - AM CH SHEFFIELDS SURE FIRE
  - DONALDSON'S APRICOT BRANDI
    fawn
    - AM CH SHEFFIELDS STUFF N NONSENSE
    - DONALDSONS RAQUEL
- AM CH FMA HIGHLAND'S DOUBLE STUFF
  Fawn
  - AM CH DONALDSON'S ON THE ROAD AGAIN
    fawn
    - AM CH LIL DAVEY OF SHEFFEILD
    - AM CH DONALDSONS MEAGAN
  - AM CH C-RAYS ILLUSION OF HALLAGAN
    fawn
    - AM CH SHEFFIELDS JERSEY BOUNCE
    - AM CH HALLAGANS ALEXIS OF C RAY Dam:
AM CH FMA CHATTY ONE
DCU1157-99
Fawn

- AM CH FMA ONE FOR THE ROAD
  Fawn
  - AM CH DONALDSON'S ON THE ROAD AGAIN
    fawn
    - AM CH LIL DAVEY OF SHEFFEILD
    - AM CH DONALDSONS MEAGAN
  - AM CH C-RAYS ILLUSION OF HALLAGAN
    fawn
    - AM CH SHEFFIELDS JERSEY BOUNCE
    - AM CH HALLAGANS ALEXIS OF C RAY
- AM CH FMA CHATTY PADDY
  Fawn
  - AM CH HALLAGAN PADDY WAGON OF ERIN
    fawn
    - AM CH SHEFFEILDS LITTLE RED WAGON
    - AM CH HALLAGONS BLARNEY MISTO ERIN
  - AM CH C-RAYS ILLUSION OF HALLAGAN
    fawn
    - AM CH SHEFFIELDS JERSEY BOUNCE
    - AM CH HALLAGANS ALEXIS OF C RAY 101
100

Fig. 4.

FILL OUT AND RETURN THIS REGISTRATION APPLICATION TO REGISTER YOUR NEW PET AND ITS MICROCHIP WITH

UNITED ALL BREED REGISTRY AND PEDIGREE SERVICE

Application Provided By Owner of Record:   If Applicable record Microchip Number:

☐☐☐☐☐☐☐☐☐☐☐☐☐

Microchip Brand: _____

The person who owns this animal has the right to name it.
Limit to 25 Letters. Skip a box between words.
Names are subject to U.A.B.R. approval. U.A.B.R. may assign a suffix number.

Name: ☐☐☐☐☐☐☐☐☐☐☐☐☐☐☐☐☐☐☐☐☐☐☐☐☐

Check One:  ☐ Full Registration   ☐ Limited Registration (<u>Not</u> to be used for Breeding)

Sex: _____   Color: _____

Date of Purchase: ____ / ____ / ____

Print New Owner's Name(s): _____

Address of Record: _____

City: _____ State: _____ Zip: _____

Phone: ( ____ ) _____

Signature(s): _____

**This Registration Application must be sent to
United All Breed Registry and Pedigree Service so we can better serve you by:**
- Recording new ownership and a description of your animal.
- Alerting the U.S.D.A., contacting national pet recovery services, and posting your information on the internet if you notify us that your animal is lost or stolen.
- Assisting pounds, shelters, medical research facilities, or pet recovery services that contact us. We will search recorded information to help identify you as the owner, making it possible for them to return your animal.
- Contributing and designating a portion of your registration fee to the American Animal Welfare Society to be used for relief of animals in need and animal related issues.
- Contributing to state and national organizations to advance education on animal related issues.
- Promoting ethical breeding and responsible pet ownership by operating within published guidelines of U.A.B.R.
- Within established guidelines, register litters produced in the future.

*As a responsible owner if you purchased this animal as a pet, please spay or neuter.*

Send your completed registration application and check or money order for $18.00 to:
**United All Breed Registry
2020 Pennsylvania Ave., NW
Suite 505
Washington, DC 20006**
- Your Pet's Pedigree will be returned along with its Permanent Registration Paper.
- Please print clearly or type as we cannot be responsible for errors caused by misspelling or illegible handwriting.
- Certificates issued with the right to correct or revoke by U.A.B.R.
- Any misrepresentation on this application is cause for cancellation and may result in loss of future registration privileges for those who violate the integrity of this application.
- We reserve the right to change all rules, fees, etc., without prior notice.

Fig. 6.

CERTIFICATE OF REGISTRY WITH
UNITED ALL BREED REGISTRY AND PEDIGREE SERVICE

Transfer of Ownership:

Print Seller's Name(s): _____

Seller's Signature(s): _____

Seller's Phone: ( _____ ) _____

Date of Sale: _____ / _____ / _____

Transfer to:

Print New Owner's Name(s) _____

Address of Record: _____

City: _____ State: _____ Zip: _____

New Owner's Phone: ( _____ ) _____

Signature(s): _____

If NOT Previously Recorded and Applicable, Record Microchip Number:

☐☐☐☐☐☐☐☐☐☐☐☐☐☐☐
Microchip Brand: _____

This Registration Certificate must be sent to United All Breed Registry and Pedigree Service so we can better serve you by:

- Recording new ownership and a description of your animal.
- Alerting the U.S.D.A., contacting national pet recovery services, and posting your information on the internet if you notify us that your animal is lost or stolen. You can write our office or call (202) 298-0935 and record a message that includes your name, phone number, and a description of the animal.
- Assisting pounds, shelters, medical research facilities, or pet recovery services that contact us. We will search recorded information to help identify you as the owner, making it possible for them to return your animal.
- Contributing and designating a portion of your registration fee to the American Animal Welfare Society to be used for relief of animals in need and animal related issues.
- Contributing to state and national organizations to advance education on animal related issues.
- Promoting ethical breeding and responsible pet ownership by operating within published guidelines of U.A.B.R.
- Within established guidelines, register litters produced in the future.

*As a responsible owner if you purchased this animal as a pet, please spay or neuter.*

Send your completed certificate and check or money order for $18.00 to:
United All Breed Registry
2020 Pennsylvania Ave., NW
Suite 505
Washington, DC 20006

- Your Pet's Pedigree will be returned along with its Permanent Registration Paper.
- Please print clearly or type as we cannot be responsible for errors caused by misspelling or illegible handwriting.
- Certificates issued with the right to correct or revoke by U.A.B.R.
- Any misrepresentation on this application is cause for cancellation and may result in loss of future registration privileges for those who violate the integrity of this application.
- We reserve the right to change all rules, fees, etc., without prior notice.

Fig. 7.

204 — UNITED ALL BREED REGISTRY
LITTER REGISTRATION APPLICATION

BREED: /— 207

OWNER OR LESSEE OF SIRE ON DATE OF MATING:
NAME: —208
ADDRESS: —209
CITY:_____ STATE:_____ ZIP:_____
PHONE:(_____)—210
DATE OF FIRST MATING: MONTH: —211 _____ DAY:_____ YEAR:_____
NAME OF SIRE: —212 _____ REG. #: * —213
SIGNATURE OF OWNER OR LESSEE: ** —214

BREEDER (OWNER OR LESSEE OF DAM ON DATE OF MATING):
NAME: —218
ADDRESS: —219
CITY:_____ STATE:_____ ZIP:_____
PHONE:(_____)—220
NAME OF DAM: —221 _____ REG. #: * —222
LITTER WHELP DATE: MONTH: —223 _____ DAY:_____ YEAR:_____
NUMBER IN LITTER: MALES —224 FEMALES —225
SIGNATURE OF OWNER OR LESSEE: ** —226

IF APPLICABLE:
BREEDERS MEMBERSHIP NUMBER: —228 _____ EXP. DATE: —229 ___/___/___

IF OWNERSHIP OR LEASE OF DAM CHANGED AFTER MATING AND BEFORE BIRTH, AND LITTER PAPERS ARE TO BE SENT TO NEW OWNER OR LESSEE, FILL OUT THIS SECTION.
OWNER OR LESSEE ON DATE OF BIRTH:
NAME: —230
ADDRESS: —231
CITY:_____ STATE:_____ ZIP:_____
PHONE:(_____)—232
SIGNATURE OF OWNER OR LESSEE: **———233

* If Sire or Dam is not registered with U.A.B.R., please complete Sire or Dam information on back of this litter application. When approved, the animal will be registered and appropriate certificates mailed to owner or lessee.

** Signature warrants that you subscribe to U.A.B.R. breeder code of ethics and information is valid and not misleading. Irrevocably agrees that U.A.B.R. is not responsible if misleading information was given. When completed and submitted, this application becomes the property of U.A.B.R. We reserve the right to correct or revoke for cause any registration issued. Any misrepresentation on this application is cause for cancellation and may result in loss of all privileges for those who violate the integrity of this application. U.A.B.R. is not responsible for any erroneous information, intended or not, on this application.

TO REGISTER, SEND APPLICATION AND CHECK OR MONEY ORDER FOR $20.00 TO:
—235

U.A.B.R.
2020 PENNSYLVANIA AVE., NW
SUITE 505
WASHINGTON, DC 20006

Fig. 8.

* If Sire is not registered with U.A.B.R., complete this section.
* If registered with another associations, please attach a photocopy of certificate.
* When approved, Sire will be registered and a certificate mailed to owner or lessee.
* If unable to complete pedigree, attach a photocopy of other registration certificate and add $6.00 for a stud book search.

238 →

| Name of Sire: |  |  |  |
|---|---|---|---|
|  | Name of Grandsire: | Great Grandsire: | Great Great Grandsire: |
| Color: |  |  | Great Great Granddam: |
| Date of birth: | Color: | Great Granddam: | Great Great Grandsire: |
| Microchip # if applicable: |  |  | Great Great Granddam: |
|  | Name of Granddam: | Great Grandsire: | Great Great Grandsire: |
|  | Color: |  | Great Great Granddam: |
|  |  | Great Granddam: | Great Great Grandsire: |
|  |  |  | Great Great Granddam: |

* If Dam is not registered with U.A.B.R., complete this section.
* If registered with another associations, please attach a photocopy of certificate.
* When approved, Dam will be registered and a certificate mailed to owner or lessee.
* If Unable to complete pedigree, attach a photo copy of other registration certificate and add $6.00 for a stud book search.

239 →

| Name of Dam: |  |  |  |
|---|---|---|---|
|  | Name of Grandsire: | Great Grandsire: | Great Great Grandsire: |
| Color: |  |  | Great Great Granddam: |
| Date of birth: | Color: | Great Granddam: | Great Great Grandsire: |
| Microchip # if applicable: |  |  | Great Great Granddam: |
|  | Name of Granddam: | Great Grandsire: | Great Great Grandsire: |
|  | Color: |  | Great Great Granddam: |
|  |  | Great Granddam: | Great Great Grandsire: |
|  |  |  | Great Great Granddam: |

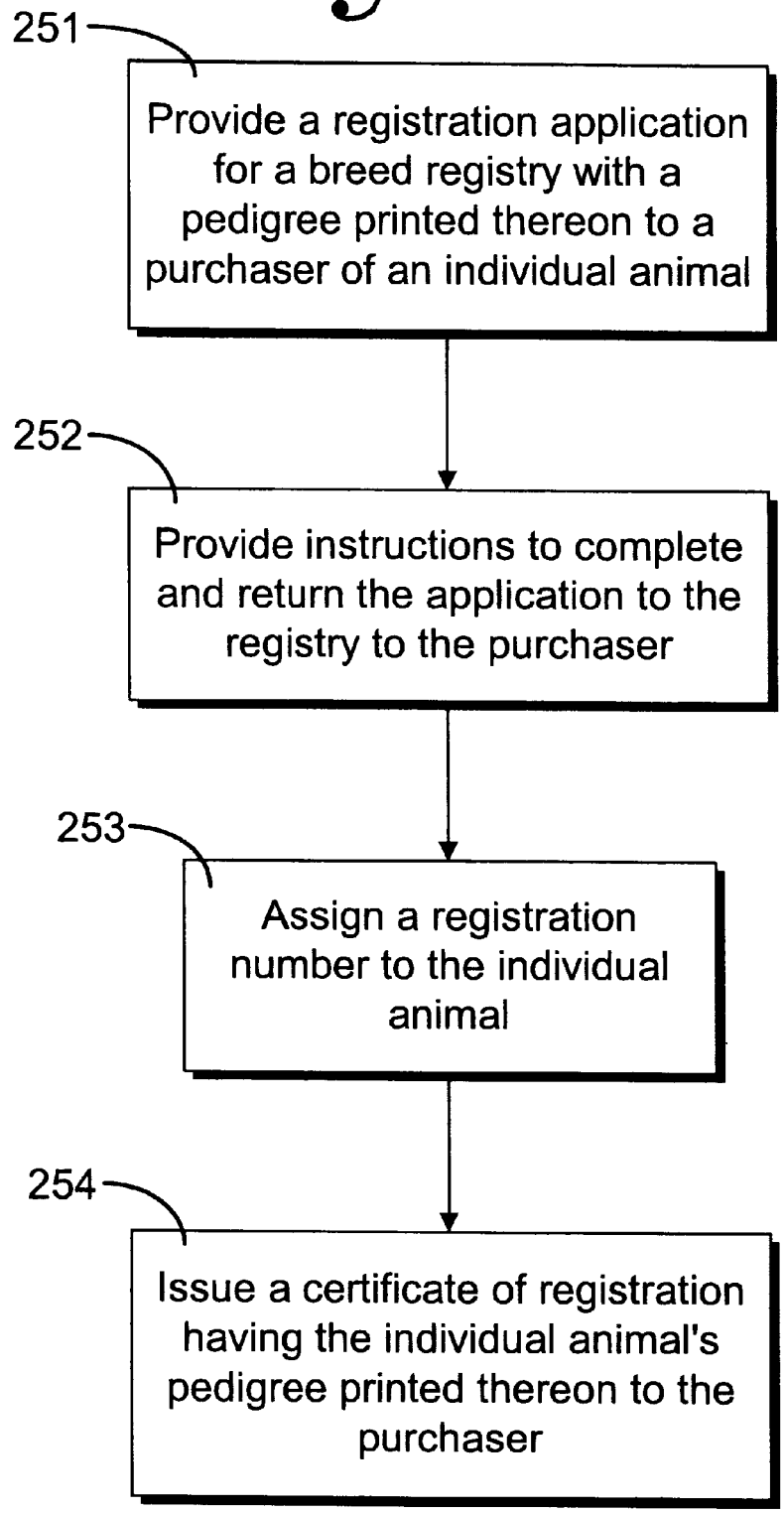

METHOD OF ENCOURAGING REGISTRATION OF ANIMALS WITH A BREED REGISTRY

BACKGROUND OF THE INVENTION

The present invention relates to an improved method for maintaining breed registries and providing pedigree information to purchasers of animals and encouraging purchasers to register the purchased animals with the breed registry.

Breed registries have been established to maintain the purity of breeds and to maintain genealogical information on breeds to permit documentation of the lineage of an animal. Purchasing offspring of registered sires and dams assures the purchaser of the genetic purity of the animal. The registration process also adds value for breeders who can command higher prices for purebred animals from registered sires and dams. The method utilized by the American Kennel Club ("AKC") to maintain its registry and encourage registration of dogs is somewhat typical of practices utilized by other breed registries.

The AKC registration process is initiated by the breeders. For a dog to be entitled to registration, it must be the offspring of a registered sire and dam of the same breed. After a litter of puppies is born, the breeder (the owner or lessee of the dam) completes and returns a litter application to the AKC. In the litter application, the breeder identifies the breed, the number of puppies in the litter, the number of males and the number of females in the litter, the registered name and registration number of the sire and dam, and identifying information for the owner or lessee of the sire or dam. Within several weeks, the AKC issues registration applications to the breeder. The registration application provides the name and registration number for the sire and dam and the name of the breeder and instructions for completing and submitting the registration application to the AKC to register the puppy.

When the breeder sells a puppy, the breeder fills in the sex and color of the puppy and the name of the purchaser on the application and the breeder signs the registration application. If the initial purchaser wants to register the puppy, the purchaser fills in a name for the puppy and signs and submits to the AKC the registration application form with the registration fee. Intermediaries, such as brokers or distributors, typically do not want to name or register the puppy prior to its subsequent transfer. If the initial purchaser is an intermediary, the intermediary does not name the puppy or sign or submit the registration application. Upon subsequent sale of the puppy by the intermediary, the intermediary completes a supplemental transfer statement, including identifying information regarding the puppy and the name of the new owner or purchaser. The intermediary signs the supplemental transfer statement and attaches it to the registration application. A supplemental transfer statement is completed and attached to the registration application each time the puppy is transferred by an intermediary.

A purchaser purchasing from an intermediary who wishes to register the puppy signs the supplemental transfer statement listing the purchaser as the owner and submits the registration application and each of the supplemental transfer statements to the AKC with the required fee. An additional fee is charged for each supplemental transfer.

Although the registration application can generally be relied upon to verify that the puppy or animal being purchased is of the breed specified, the registration application does not provide enough information to determine if the puppy is the product of inbreeding. Breeders who are breeding show or competition stock will sometimes inbreed their animals in an effort to emphasize certain traits of the parents and produce champion caliber offspring. Although such inbreeding often does produce champion quality offspring, just as often, inbreeding emphasizes undesirable traits or health defects. In the pet industry, most pet purchasers are simply trying to purchase pets for companionship and not as show animals. Such companion pets generally are not sought for their show qualities, but for their temperament and health.

If the end purchaser purchases the pet directly from a breeder, the purchaser could ask to see or obtain copies of the pedigrees of the sire and dam from the breeder to verify that the animal they are purchasing is not the result of inbreeding. However, most breeders typically do not have a printed copy of the pedigree for the sire and dam and it typically takes four to six weeks to obtain the pedigrees on the sire and dam from AKC and the current charge to obtain pedigrees from the AKC is currently approximately $38 for each animal. Because of the time and cost of obtaining pedigrees, many breeders do not want to bother with obtaining pedigrees on their sires and dams.

Many pet owners purchase their pets through pet stores or other intermediaries. The AKC registration application, which is often the only documentation for the dog provided to the purchaser by an intermediary, simply provides the registration number and name for the sire and dam as identifying information for the dog. To obtain more extensive pedigree information on the dog, the purchaser must pay an additional fee with the registration application or pay a pedigree researcher to do the genealogical research. As noted previously, obtaining a pedigree through AKC typically takes four to six weeks, and well after any purchasing decisions as to the dog would be made.

Another problem associated with the procedure utilized by the AKC is the time delay which often occurs between transfer of the puppy and the registration application. In particular, it typically takes three weeks if not longer for the AKC to provide a breeder registration applications in response to filing of a litter application. If the puppies are sold prior to receipt of the registration applications, which happens often, the paperwork typically does not catch up to the puppy in the distribution channel and the ultimate purchaser may not receive the registration application for several weeks after the purchase. In addition, even if a broker receives the registration application prior to their subsequent transfer of the animal, they typically do not transfer the registration application to the retailer until they receive payment for the animals purchased which may take several weeks, such that the registration applications typically do not reach the end purchaser for several weeks after their purchase. By then the novelty of purchasing a purebred animal may have worn off, and the purchaser of a pet for companionship as opposed to show purposes is unlikely to complete and return the registration application.

SUMMARY OF THE INVENTION

The present invention comprises a method for encouraging purchasers of pets or other types of animals to register the animals with a genealogical or breed registry. The method involves providing a purchaser of an animal, at the time of purchase, an application form for registration of the animal with the registry wherein the application form includes sire and dam information for at least two immediately previous generations of the animal. The registration application includes instructions for completing the application by providing a name for the animal and instructions to return the application to the registry. Upon receipt of the application, the registry assigns a registration number to the animal and issues a certificate of registration to the purchaser including the name and registration number of the animal, and the sire and dam information for at least two immediately previous generations of the animal.

The registration applications may be issued to the breeder or any intermediary in the distribution chain which is able to provide the required genealogical information from a reliable source. Distributors wishing to utilize the registration process, must satisfy the requirements of the registry or registering organization to help ensure that the genealogical information provided by the distributor is from reliable sources and is accurate. The distributors can supply the genealogical information to the registry which in turn prints the necessary registration applications with the genealogical information including sire and dam information for at least two immediately previous generations printed thereon which are then provided to the distributor. The distributor then distributes or provides the registration applications to the purchasers upon purchase of the animal. To expedite the process, authorized distributors can be provided with camera ready artwork to print the registration applications with the required genealogical information. Intermediate distributors therefore do not have to rely on the breeders to initiate the registration process. Intermediate distributors can also take steps to ensure that the registration application is available at the time of purchase of the animals. Further, the process provides means for the intermediate distributors to document that the animals they are selling are not the product of inbreeding.

OBJECTS AND ADVANTAGES OF THE INVENTION

The objects of this invention include providing a method for maintaining a breed registry which encourages purchasers of individual animals of the breed to register the individual animals with the breed registry; to provide a method for distributing registration applications for the registry which can be initiated by distributors of the animals other than the breeder; to provide such a method in which the registration application is available for the distributor to provide to the purchaser at the time of purchase; to provide such a method which provides genealogical information concerning the individual animal to the purchaser; to provide such a method which can provide purchasers with ready means to verify that the individual animal to be purchased is not the product of inbreeding; and to provide such a method which is relatively inexpensive to implement and which is particularly well adapted for its intended uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a plan view of a registration application form for use in registering an animal with a genealogical registry.

FIG. 2 is a plan view of a certificate of registration corresponding to the registration application shown in FIG. 1.

FIG. 3 is a plan view of a first side of an alternative embodiment of a registration application form for use in registering an animal with a genealogical registry.

FIG. 4 is a plan view of a second side of said registration application as shown in FIG. 3.

FIG. 6 is a plan view of a second side of the certificate of registration as shown in FIG. 5.

FIG. 7 is a plan view of a first side of a litter registration application.

FIG. 8 is a plan view of a second side of the litter registration application.

FIG. 9 is a block diagram of a method of encouraging registration of an individual animal with a genealogical registry.

DETAILED DESCRIPTION OF THE INVENTION

Figure 5:
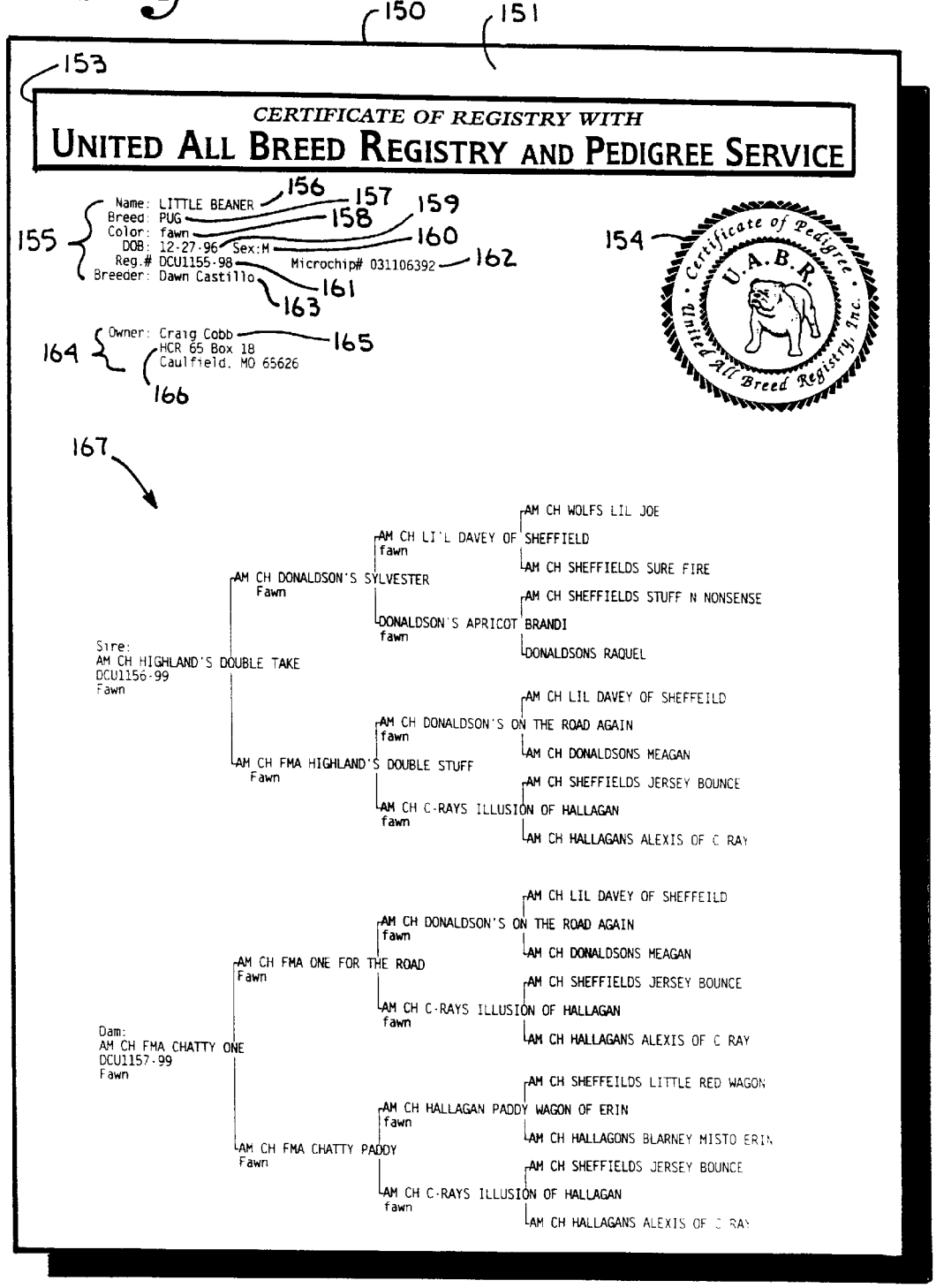
FIG. 5 is a plan view of a first side of an alternative embodiment of a certificate of registration corresponding to the registration application shown in FIGS. 3 and 4.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriately detailed form.

Referring to the drawings, FIGS. 1 through 8 show various forms or documents adapted for use in registering an individual animal with a breed registry. FIG. 1 shows a registration application 1 for use by a purchaser in registering an individual animal with a pet registry. The application 1 includes a heading 3 and identifying information 4 for the individual animal including a listing of the breeder's name 5, a listing of the breed 6, a listing of the date of birth 7, and an assigned litter number 8. A pedigree 10 for the individual animal is printed on the application 1 and includes sire and dam information for at least two immediately previous generations of the individual animal. The application 1 shown in FIG. 1 includes sire and dam information for three immediately previous generations of the individual animal. In particular the pedigree 10 provides the names of the sire 15 and dam 16, the names of the sire's sire 17 and the sire's dam 18, the names of the dam's sire 19 and the dam's dam 20, the names of the sire's paternal grandsire 21 and grandam 22, the names of the sire's maternal grandsire 23 and grandam 24, the names of the dam's paternal grandsire 25 and grandam 26, and the names of the dam's maternal grandsire 27 and grandam 28.

The application 1 provides a name space 33 comprising twenty five boxes in which the purchaser may enter a name for the individual animal and microchip number space 34 comprising approximately fourteen boxes in which the purchaser may enter a micro chip number associated with a micro chip implanted in the individual animal. Spaces are also provided to supply the sex of the individual animal, space 35, the color of the individual animal, space 36, and the date of sale to the purchaser 37. The application 1 also provides spaces for entry of identifying information for the purchaser, including the name of the purchaser, space 40, the address of the purchaser, space 41, and the phone number for the purchaser, space 42. A space 43 is also provided for the purchaser's signature.

Instructions 45 are also provided, instructing the purchaser to complete the application 1 and return it to a specified address for the registry with a required payment. Additional instructions 46 are also provided on naming the individual animal. For example, as shown in FIG. 1, it is noted that names are limited to 25 letters and are subject to approval by the registry. The naming instructions 46 also indicate that the registry retains the right to assign suffix numbers to the selected name. Registries typically retain such a right to insure that each individual animal has a distinct name for registration purposes.

FIG. 2 shows a registration certificate 51 corresponding to the registration application 1. The registration certificate 51 includes a heading 52 and a seal 53. Identifying information 54 for the individual animal is printed on the certificate, including, the individual animal's name 55, breed 56, color 57, date of birth 58, sex 59, registration number 60, microchip number 61 and the name of the breeder 62. Identifying information 64 for the owner of the individual animal is also printed on the registration certificate 51 including the owner's name 65 and address 66.

A pedigree 67 including sire and dam information for the three immediately previous generations of the individual animal, identical to the pedigree 10 printed on the registration application 1, is printed on the registration certificate 51.

The certificate of registration 51 also incorporates an ownership transfer recordation application 70. Application 70 is used to record a transfer of ownership of an individual animal after it has been registered, to ensure that the correct ownership is recorded with the registry records. The ownership transfer recordation application 70 includes spaces to identify the seller's name, space 71, the seller's phone number, space 72 and the date of sale, space 73. A space is also provided for the seller's signature, space 74. The name of the seller should correspond to the name of the owner listed on the registration certificate 51. However, it is foreseeable that the registry might permit subsequent purchasers of an individual animal to record the transfer of ownership to them even if an intermediate owner had not.

The ownership transfer recordation application 70 also includes spaces to identify the new owner's name, space 75, the new owner's address 76 and the new owner's phone number 77. A space 78 is also provided for the new owner's signature and a space 79 is provided to record a microchip number if not previously recorded.

The certificate of registration 51 also includes instructions 80 for completing the ownership transfer recordation application 70 and filing the application 70 with the registry with the appropriate fee to record any changes of ownership.

FIGS. 3 and 4 disclose an alternative embodiment of a registration application 100, FIG. 3 showing a first side 101 of the application 100 and FIG. 4 showing a second side 102 of the application 100. The first side 101 of the registration application 100 generally provides identifying information for the individual animal and its pedigree. More specifically, the first side 101 includes a heading 103 and identifying information 104 for the individual animal including the name of the breeder 105, the individual animal's breed 106 and date of birth 107, and a litter number 108 for the individual animal's litter. A pedigree 110 is printed on the first side 101 of the registration application and includes sire and dam information for four immediately previous generations of the individual animal.

The second side 102 of the application 100 includes a heading 114 including instructions 115 on completing and returning the form to the registry. The second side includes spaces for the purchaser to provide information for use in registering the individual animal with the registry. In particular, the second side includes a name space 117 comprising twenty five boxes in which the purchaser may enter a name for the individual animal and a microchip number space 118 comprising approximately fifteen boxes in which the purchaser may enter a microchip number associated with a microchip implanted in the individual animal. Spaces are also provided to supply the sex of the individual animal, space 119, the color of the individual animal, space 120, and the date of sale to the purchaser 121. The application 100 also provides spaces for entry of identifying information for the purchaser, including the name of the purchaser, space 122, the address of the purchaser, space 123, and the phone number for the purchaser, space 124. A space 125 is also provided for the purchaser's signature.

Instructions 128 are also provided, instructing the purchaser to complete the application 100 and return it to a specified address for the registry with a required payment. Additional instructions 129 are also provided on naming the individual animal and recording a microchip number. For example, as shown in FIG. 4, it is noted that names are limited to 25 letters and are subject to approval by the registry. The naming instructions 46 also indicate that the registry retains the right to assign suffix numbers to the selected name.

The registration application 100 also provides, on the second side 102, a listing 131 of services offered by the registry or advantages to registration in an effort to encourage registration. The name and address 133 of the individual or entity selling the individual animal may also be printed on the registration application 100 at the seller's request.

FIGS. 5 and 6 show an alternative embodiment of a registration certificate 150 having a first side 151 and a second side 152 and generally corresponding to the registration application 100. The first side 151 of the registration certificate 150 generally comprises a pedigree and includes a heading 153, a seal 154. Identifying information 155 for the individual animal is printed on the certificate first side 151, including, the individual animal's name 156, breed 157, color 158, date of birth 159, sex 160, registration number 161, microchip number 162 and the name of the breeder 163. Identifying information 164 for the owner of the individual animal is also printed on the registration certificate first side 151 including the owner's name 165 and address 166.

The individual animals pedigree 167, comprising sire and dam information for the four immediately previous generations of the individual animal, identical to the sire pedigree 110 printed on the registration application 100, is printed on the registration certificate first side 151.

The second side 152 of the certificate of registration 150 generally comprises an ownership transfer recordation application which can be used to record a transfer of ownership of an individual animal after it has been registered. The second side 152 includes a heading 170 and spaces to identify the seller's name, space 171, the seller's phone number, space 172 and the date of sale, space 173. A space is also provided for the seller's signature, space 174.

The second side 152 also includes spaces to identify the new owner's name, space 175, the new owner's address 176 and the new owner's phone number 177. A space 178 is also provided for the new owner's signature and a space 179 is provided to record a microchip number if not previously recorded.

The second side 152 of the certificate of registration 150 also includes instructions 180 for completing or filling in the spaces on the second side 152 and filing the certificate of registration 150 with the registry with the appropriate fee to record any changes of ownership. The second side 152 also includes a listing 131 of services offered by the registry or advantages to registration in an effort to encourage registration.

A litter registration application 200 is shown in FIGS. 7 and 8, FIG. 7 showing a first side 201 and FIG. 8 showing a second side 202. The first side 201 includes a heading 204 and a number of spaces for providing information concerning the sire and dam and the owners or lessees thereof. In particular, the first side 201 of the litter registration application includes spaces to identify the breed of the sire and dam, space 207, the name, address and phone number of the owner or lessee of the sire on the date of mating, spaces 208, 209 and 210 respectively, the date of first mating, space 211, the name of the sire, space 212, the registration number of the sire with the registry, space 213, and a space for the signature of the owner or lessee of the sire, space 214.

The first side 201 also includes spaces to identify the name, address and phone number of the owner or lessee of the dam on the date of mating, spaces 218, 219 and 220 respectively, the name of the dam, space 221, the registration number of the dam with the registry, space 222, the litter whelp date, space 223, the number of males in the litter, space 224, the number of females in the litter, space 225 and a space for the signature of the owner or lessee of the dam at the time of mating, space 226.

The first side 201 also includes a space for listing of the breeder's membership number with the registry, space 228 and the membership expiration date, space 229. Spaces are also provided to record identifying information for a purchaser or lessee of the dam who acquired ownership or leased the dam after mating and before birth of the litter including a spaces for the new owner or lessee's name, address, phone number and signature, spaces 230–233 respectively. The first side 201 also includes instructions 235 for completing and returning the application to an address specified for the registry with the appropriate fee.

The second side 202 of the litter registration application 200 comprises a sire pedigree form 238 for providing sire and dam information for the sire of the litter including his three immediately previous generations and a dam pedigree form 239 for providing sire and dam information for the dam of the litter including her three immediately previous generations. Instructions 240 are provided instructing the applicant to complete the sire pedigree form 238 if the sire is not previously registered with the registry and requesting documentation to verify the pedigree if the sire is registered with another registry or alternatively instructing the applicant to provide a copy of a registration certificate for the sire and a required fee for the registry to complete the pedigree research. Similarly instructions 241 are provided instructing the applicant to complete the dam pedigree form 239 if the dam is not previously registered with the registry and requesting documentation to verify the pedigree if the dam is registered with another registry or alternatively instructing the applicant to provide a copy of a registration certificate for the dam and a required fee for the registry to complete the pedigree research.

The pedigree forms 238 and 239 also include spaces for recording the sire and dams colors, date of birth and microchip number if applicable as well as the color of the grandsires and grandams. Similarly, the pedigrees printed on any of the applications or certificates noted above can be modified to print additional known information about each animal in the pedigree, such as its color, litter number, microchip number and the like.

Method

The above noted forms or documents as shown in FIGS. 1 through 8 are adapted for use in encouraging the purchasers of individual animals to register the animals with the breed registry issuing the documents to assist in developing and maintaining a breed registry. Although registration applications 1 and 100 and certificates of registration 51 and 150 are generally interchangeable, reference will generally be made to registration application 1 and certificate of registration 51 in describing the method of the present invention.

In general, the method comprises providing a purchaser of an individual animal, at the time of purchase, one of the registration applications 1 with the animals pedigree 10 for at least two immediately previous generations printed thereon as generally shown in FIG. 1 which includes the pedigree 10 for the three immediately previous generations printed thereon. The method also comprises providing instructions to the purchaser to complete the registration application 1 and return the completed registration application 1 to the registry with the appropriate registration fee. Although registration application 1 provides a specific instruction on naming the individual animal, and a specific instruction to return a completed application, simply providing a registration application form with blanks to fill in with identifying information for the individual animal, including a name, and identifying information for the purchaser or applicant would be considered instructions to complete the application. In completing the registration application, the applicant or purchaser of the individual animal provides a name for the individual animal in the name space 33 and fills in a microchip number for the individual animal, if available, in space 34. The purchaser also fills in the sex, color and date of sale of the animal in spaces 35–37 respectfully, and the purchaser fills in his or her name, address and phone number in spaces 40–42 and then signs the application in space 43.

Upon receipt of a completed registration application 1 with the appropriate fee, the registry assigns a registration number to the individual animal and enters the information from the registration application 51 and the registration number into a relational database. Information entered into the database includes the identifying information 4 for the individual animal including the breeder's name 5, the breed 6, date of birth 7, litter number 8, the animal's name entered in space 33, the microchip number entered in space 34, the sex, color and date of sale of the animal from spaces 35–37 and the owner's name, address and phone number from spaces 40–42. As discussed in more detail below, the sire and dam information from the pedigree 10 for the animal as printed on the registration application 1 will have already been entered into the relational database. Once the information from the registration application 1 is entered into the relational database, the registry prints a certificate of registration 51 with the information noted above and sends it to the applicant. As noted above, the certificate of registration 51 includes the individual animal's name 55, breed 56, color 57, date of birth 58, sex 59, registration number 60, microchip number 61 (if applicable), the name of the breeder 62, and the pedigree or sire and dam information 67 which is the same as provided on the registration application 1. Identifying information for the owner of record 64, including the owner's name 65 and address 66 are also printed on the certificate of registration 51.

FIG. 9 comprises a simplified block diagram of the method of the present invention. Block 251 corresponds to the step of providing the purchaser of an individual animal a registration application for a breed registry with a pedigree printed thereon. Block 252 corresponds to the step of providing instructions to the purchaser to complete and return the application to the registry. Block 253 corresponds to the step of assigning a registration number to the individual animal and block 254 corresponds to the step of issuing a certificate of registration to the purchaser having the individual animal's pedigree printed thereon.

To promote the registration program and distribute the registration applications 1 or 100, the registry works with individuals or entities distributing the animals to provide them with the registration applications 1 or 100 for individual animals for distribution to purchasers either directly or through intermediate purchasers. There are several different methods by which the registration application 1 or 100 may be generated and supplied to the purchaser depending on part on the method of distribution of the animal.

In the companion pet industry and in particular with dogs, there are typically three primary types of sellers of dogs, breeders, brokers and retailers such as pet stores. Each of these may generally be referred to as sellers or distributors. In the method of encouraging registration, the registry preferably works with each of these classes of sellers to permit them to initiate or provide the registration applications to their purchasers who can complete and return the applications or in the case of intermediate purchasers, who can pass the applications on to their purchasers.

When working with breeders (generally the owner or lessee of the dam), the registry may provide the breeder with a plurality of litter registration applications 200 with instructions to complete and submit to the registry, upon the birth of a litter, a litter registration application 200 with the required fee. The breeder fills in the spaces on the litter application as discussed above providing identifying information on the sire and dam including their registration numbers with the registry, identifying information on the owners or lessees of the sire and dam and the numbers of males and females in the litter. If either the sire and dam are not registered with the registry, the breeder is required to provide the pedigree for the unregistered animal from a verifiable source to register the litter. In a preferred embodiment of the method, the breeder's are required to provide sire and dam information for at least the three immediately previous generations for any unregistered animal. The registry will already have the desired sire and dam information entered into its relational database for any animals previously registered with the registry and therefore the breeder is not required to provide this information. After completing the litter registration application 200, the breeder then submits the litter registration application 200 to the registry with the required fee. The registry assigns a litter number or other identifying indicia to each animal in the litter and enters the information on the litter registration application 200 into the relational database along with the litter numbers. Generally, there will a successive litter number for each animal in the litter. If there are five animals in a litter, there will be five successive litter numbers. The litter numbers may incorporate letters or other indicia to identify the breeder and the year the litter was born. The registry then prints registration applications 1 with the information noted above and sends the registration applications to the breeder. The breeder then provides a registration application 1 to the purchaser of each of the offspring in the litter.

In cases where the breeder must provide the pedigree of one or both of the sire and dam, the breeder is instructed to provide documentation verifying the pedigree. For example, the breeder may provide a copy of a pedigree for the unregistered sire or dam from another registry. The breeder may also be given the option of paying a fee to the registry to have the registry research or contract out to have someone research the pedigree of the sire or dam or both.

The registry also works with brokers to permit the brokers to provide their purchasers with registration applications 1, even if the breeder does not obtain or distribute the registration applications. Many brokers, particularly in the dog industry, already have databases containing pedigree information for the sires and/or dams of breeders from whom they frequently purchase animals or the brokers work with established stud book researchers to obtain the pedigree information on animals whose pedigree has not been entered into the broker's database. The registry reviews the procedures utilized by the broker to verify the that the procedures utilized are likely to produce accurate pedigrees. The registry then provides the broker with registration applications 1 without the identifying information 4 or pedigree printed thereon.

When the broker purchases an animal from a breeder, the broker obtains the identifying information 4 for the animal from the breeder and the pedigree information either from its own database or from a reliable source such as an established stud book researcher. The identifying information 4 is entered into the broker's database along with the pedigree (if not already in the database). The broker assigns the animal a litter number which is also entered into the broker's database. The registry may require the broker to incorporate a prefix to its litter numbers which identifies the broker and distinguishes its litter numbers from those of other brokers, so that no two animals in the registries database have the same litter number. The prefix may comprise letters or numbers or other indicia. The broker prints the identifying information 4 (including the litter number 8) and the pedigree 10 onto a registration application 1. When the broker sells the animal, the broker transfers or distributes the registration application 1 with the animal.

The broker may also supply identifying information 4 and the pedigree 10 to the registry and have the registry print a registration application 1 and return it to the broker. If the sire and dam are already registered with the registry, the broker would only have to provide identifying information 4 and the registration numbers for the sire and dam. The registry would then be able to generate a pedigree from its existing database.

The registry may also work with retailers to permit them to print or obtain registration applications in the same manner as the brokers.

The registry instructs the distributors or sellers with which it works, that the registration applications are intended to be completed and returned by the end purchaser. The distributors are instructed to instruct any intermediate transferees to pass the registration applications on to the end purchaser. The brokers and retailers typically are not interested in registering individual animals prior to sale, because they do not want to incur the expense of doing so and they want to provide the purchaser the opportunity to name the animal.

It is becoming more common for distributors of animals to implant microchips into the animal prior to sale to add value to the animal. Similarly, animal owners are increasingly having microchips implanted in their animals. The microchip may include identifying information for the animal to help identify lost or stolen dogs which have been recovered. As noted above the microchip number associated with the microchip may be printed by the purchaser on the registration application, such as in space 34 of application 1. If the seller had a microchip implanted in the animal, the seller could complete the microchip number space 34 prior to transfer of the animal or simply provide the purchaser with the number.

The registry then works through governmental agencies or animal welfare organizations to encourage animal shelters to scan any animals brought into the shelter with a device which would receive a microchip number from the microchip and to check with the registry to attempt to cross-reference the animal with its owner using the microchip number if the animal is registered with the registry. The registry similarly works with governmental agencies or animal welfare organizations or entities regulating medical testing to have them encourage or require entities such as testing laboratories to scan animals purchased for medical experiments and to check with the registry to verify that the animal has not been reported as stolen to the registry. The registry can offer other services such as those identified in FIGS. 4 and 6 and promote such services to the purchasers of animals on the registration application to encourage registration and on the certificate of registration to encourage subsequent purchasers to record the transfer of ownership.

As noted above, a portion of the certificate of registration, 51 or 150, comprises a ownership transfer recordation application. If an purchaser who has registered his or her animal with the registry and received a certificate of registration 51, subsequently sells the animal, the seller and the new purchaser complete the ownership transfer recordation application 70 and the new owner submits the certificate 51 with the required fee to the address specified on the certificate 51. The certificate 51 provides instructions to complete the ownership transfer recordation application 70 and to return the certificate 51 to the registry to record the transfer of ownership. In completing the ownership transfer recordation application 70 the parties fill in the seller's name and phone number and the date of sale, the new owner's name address and phone number and both parties sign the document in the spaces provided. The certificate 51 provides instructions instructing the seller or purchaser to provide or record a microchip number for the animal if not done previously. Upon receipt of the certificate 51 with the completed ownership transfer recordation application 70, the registry changes records the new information concerning the identity of the new owner of the animal in the relational database and enters a microchip number if provided and not previously entered in the relational database. The registry then prints a new certificate of registration 51 providing the identifying information for the new owner and sends the new certificate of registration 51 to the listed owner.

It is to be understood that while certain forms of the present invention have been illustrated and described herein, it is not to be limited to the specific forms or arrangement of parts described and shown.

What is claimed and desired to be secured by Letters Patent is as follows:

1. A method for encouraging purchasers of individual animals of a species to register said individual animals with a genealogical registry, comprising the steps of:
   (a) providing a purchaser of an individual animal of said species an application form for registration of said individual animal with said registry; said application form having sire and dam information for at least two immediately previous generations of said individual animal printed thereon;
   (b) providing instructions to said purchaser to complete said application form providing a name for said individual animal and instructions to return said application form to said registry; and
   (c) registering said individual animal with said registry upon receipt of said application form.

2. The method as in claim 1 wherein said step of providing an application form comprises providing said application form wherein said application form includes sire and dam information for at least three immediately previous generations of said individual animal printed thereon.

3. The method as in claim 1 further comprising the steps of:
   (a) assigning a registration number to said individual animal upon receipt of said application form; and
   (b) issuing a certificate of registration to said purchaser including said name for said individual animal, said registration number for said individual animal, and said sire and dam information for at least two immediately previous generations of said individual animal.

4. The method as in claim 3 further comprising the step of inputting said name of said individual animal, said registration number of said individual animal and said sire and dam information for said individual animal into a relational database upon receipt of said application form from said purchaser.

5. The method as in claim 4 wherein said step of providing instructions to said purchaser further comprises providing instructions to said purchaser to enter on said application form a microchip number associated with a microchip implanted in said individual animal; and said method further comprises inputting said microchip number for said individual animal into said database upon receipt of said application from said purchaser and associating said microchip number for said individual animal with said registration number.

6. A method for encouraging purchasers of individual animals of a species to register said individual animals with a genealogical registry, comprising the steps of:
   (a) providing a purchaser of an individual animal of said species an application form for registration of said individual animal with said registry; said application form having sire and dam information for at least two immediately previous generations of said individual animal printed thereon;
   (b) providing instructions to said purchaser to complete said application form providing a name of said purchaser, an address for said purchaser, a name for said individual and a microchip number associated with a microchip implanted in said individual animal and instructions to return said application form to said registry;
   (c) assigning a registration number to said individual animal upon receipt of said application form; and
   (d) issuing a certificate of registration to said purchaser including said purchaser's name, said individual animal's name, said registration number for said individual animal, said microchip number for said individual animal and said sire and dam information for at least two immediately previous generations of said individual animal.

7. The method as in claim 6 wherein said step of providing an application form comprises providing said application form wherein said application form includes sire and dam information for at least three immediately previous generations of said individual animal printed thereon.

8. The method as in claim 6 further comprising the step of inputting said purchaser's name, said purchaser's address, said individual animal's name, said registration number for said individual animal, said microchip number for said individual animal and said sire and dam information for said individual animal into a relational database upon receipt of said application form.

9. A method for maintaining a genealogical registry for a species of animals comprising the steps of:
 (a) supplying a distributor of said species of animals with an application form for registration of an individual animal of said species of animals with said registry; said application form having sire and dam information for at least two immediately previous generations of said individual animal printed thereon;
 (b) instructing said distributor to transfer said application form to a purchaser of said individual animal at the time of purchase;
 (c) providing instructions to said purchaser to complete said application form providing a name for said individual and instructions to return said application form to said registry;
 (d) receiving said application form completed by said purchaser for said individual; and
 (e) registering said individual animal with said registry upon receipt of said application form.

10. The method as in claim 9 wherein said step of supplying an application form comprises supplying said application form wherein said application form includes sire and dam information for at least three immediately previous generations of said individual animal printed thereon.

11. The method as in claim 9 further comprising the steps of:
 (a) assigning a registration number to said individual animal upon receipt of said application form; and
 (b) issuing a certificate of registration to said purchaser including said name for said individual animal, said registration number for said individual animal and said sire and dam information for at least two immediately previous generations of said individual animal.

12. The method as in claim 11 further comprising the step of inputting said name of said individual animal, said registration number of said individual animal and said sire and dam information for said individual animal into a relational database upon receipt of said application form from said purchaser.

13. The method as in claim 12 wherein said step of providing instructions to said purchaser further comprises providing instructions to said purchaser to enter on said application form a microchip number associated with a microchip implanted in said individual animal; and said method further comprises inputting said microchip number for said individual animal into said database upon receipt of said application from said purchaser and associating said microchip number for said individual animal with said registration number.

14. A method for encouraging purchasers of individual animals of a species to register said individual animals with a genealogical registry; said method comprising the steps of:
 (a) having a distributor of animals of said species print identifying information and sire and dam information for at least two immediately previous generations regarding an individual animal on an application form for registration of individual animals of said species with said registry;
 (b) instructing said distributor to transfer said application form with identifying information and sire and dam information printed thereon to a purchaser of said individual animal at the time of purchase;
 (c) providing instructions to said purchaser to complete said application form providing a name for said individual animal and instructions to return said application form to said registry;
 (d) receiving said application form completed by said purchaser for said individual animal;
 (e) registering said individual animal with said registry upon receipt of said application form.

15. The method as in claim 14 further comprising the step of verifying, by said registry, said distributor's ability to provide accurate sire and dam information for individual animals.

* * * * *